June 11, 1929.  T. J. McNULTY  1,717,114
PACKING FOR RECIPROCATING PISTONS
Filed Dec. 28, 1926

Inventor
Thomas J. McNulty

Patented June 11, 1929.

1,717,114

UNITED STATES PATENT OFFICE.

THOMAS J. McNULTY, OF BROOKHAVEN, MISSISSIPPI.

PACKING FOR RECIPROCATING PISTONS.

Application filed December 28, 1926. Serial No. 157,545.

This invention relates to a packing for reciprocating rods and aims to provide a novel and improved device of this character which may be conveniently arranged in a stuffing box for efficiently preventing leakage through the box.

Another object of the invention is to provide a packing for stuffing boxes which will permit the taking up of the gland of a stuffing box as tight as the same will stand without materially increasing friction on the rod reciprocating in the box, thus lengthening the life of the packing and eliminating to a great extent wear on the rod.

It is also an object of the invention to provide a packing of the above indicated character, which is simple and substantial in construction, which can be manufactured economically, and which will be thoroughly efficient and practical in use.

With the foregoing and other objects in view, which will be apparent as the description proceeds, the invention resides in the construction and arrangement of parts, as hereinafter described and claimed, it being understood that changes can be made within the scope of what is claimed, without departing from the spirit of the invention.

Figure 1:
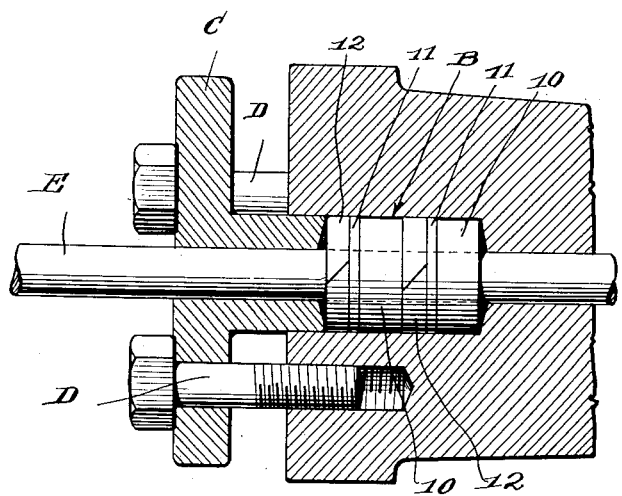
Figures 2, 3:
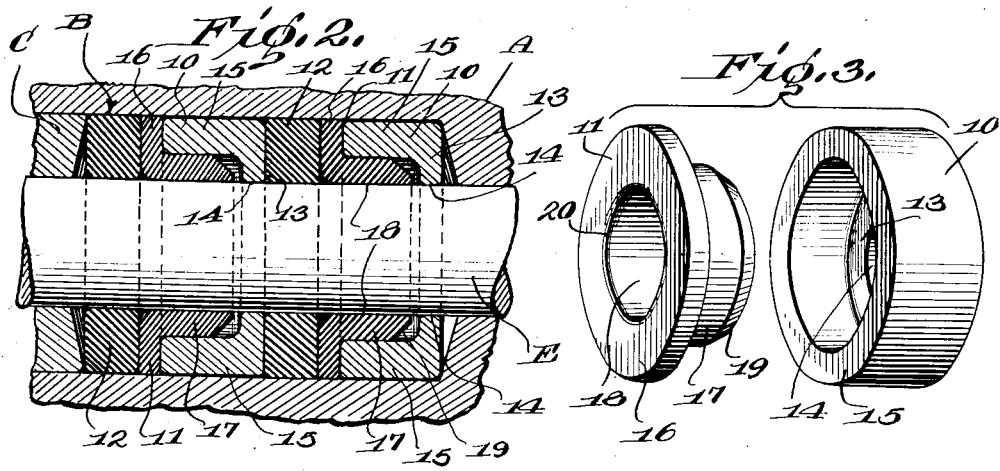
Figure 4:
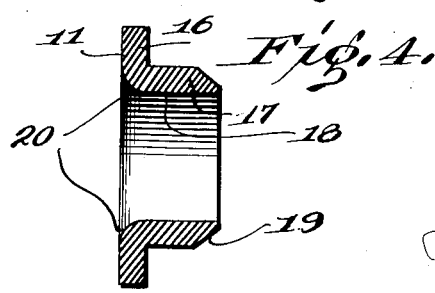

The invention is illustrated in the accompanying drawings, wherein:

Figure 1 is a section through a stuffing box showing my improved packing arranged therein in elevation, Figure 2 is an enlarged fragmentary section through the packing, Figure 3 is perspective views of a crimp and metallic cup used in my packing, and Figure 4 is a section through one of the crimps before the same is placed in a stuffing box.

Referring to the drawings, the letter A designates a stuffing box having an opening B therein for receiving packing and a gland C which is adapted to be moved within the opening B by means of bolts D for tightening the packing in the stuffing box. A rod E is illustrated as extending through the gland C and through the main body of the stuffing box, said rod being arranged for reciprocating motion.

In carrying out my invention, the numeral 10 indicates metallic cup members, the numeral 11 yieldable crimps, and the numeral 12 yieldable rings, any number of which are adapted to be placed within the opening B of the stuffing box A, according to the length of the opening B.

Each of the cup-shaped metallic members 10 consists of a central disk-shaped portion 13 having a central opening 14 therein through which the rod E is adapted to slide and a cylindrical flange 15 at the periphery of said disk 13 and extending to one side of said disk. The outer face of the disk 13 and the outer face at the end of the annular flange 15 are parallel and flat, as clearly illustrated in Figure 2 of the drawings. The outer periphery of the cup-shaped members is adapted to engage the cylindrical wall of the opening B.

The crimps 11 which are constructed of leather, or any other material that will answer the purpose, consist of outwardly extending annular flanges 16 having cylindrical portions 17 extending from one side thereof and centrally thereof. The cylindrical openings 18 which extend through the cylindrical portions 17 also extend through the portions of the crimps where the annular flanges 16 are provided. The outer ends of the cylindrical portions 17 are beveled at an angle, as at 19, while rounding corners 20 are formed where the cylindrical opening 18 merges into the outer surface of the outwardly extending annular flange 16 during the construction of the crimps, said rounded corners 20 being clearly illustrated in Figure 4 of the drawings.

During the construction of the crimps 11 of leather or similar material, it is necessary to force the cylindrical portion 17 of each crimp from a disk shaped piece of material. Thus it can be seen that the tendency of the outer portion of the disk will be to contract and thus be of a slightly smaller diameter than the portion of the cylindrical portion at the annular flange 16. When assembling the crimps, the outer portions of the crimps necessarily engage the rod E tighter than the portions of the crimps adjacent the annular flanges. By then compressing the annular flanges 16 between parallel arranged surfaces, it can be seen that the portions of the cylindrical portions 17 will be forced into engagement with the shaft so as to prevent leakage, while the natural tendency of the outer portions of the cylindrical portions 17 is to remain in engagement with the rod E. Thus it can be seen that the entire inner surfaces of the cylindrical portions 17 will be in engagement with the rod E.

The yieldable rings 12 are constructed of leather, or any other similar material found practical, and are of the split ring type so as to permit expansion and contraction thereof. The rings 12 have interior cylindrical surfaces through which the rod 13 slides and outer cylindrical surfaces which engage the cylindrical wall of the opening B. The opposite sides of the rings 12 are flat and parallel with each other.

When arranging my improved packing in the stuffing box, the gland C is removed and one of the metallic cup-shaped members is slid on the rod E and into the opening B, said metallic cup-shaped member when positioned in the opening B has the cylindrical flange 15 thereof extending outwardly of the opening. One of the yieldable crimps 11 is then slid upon the rod and into the opening B until the cylindrical flange 17 thereof extends into the cup-shaped metallic member first placed in the opening B and with the annular flange 16 thereof abutting against the outer end of the cylindrical flange 15 of the metallic cup-shaped member 13. Then one of the yieldable rings 12 is slid upon upon the rod 13 and into the opening B. This completes one unit of my packing and it is to be understood that any number of units may be used according to the length of the opening B in the stuffing box. When associating my device with longer stuffing boxes, another one of the metallic cup-shaped members is then placed in the opening B, another one of the crimps 11, and another of the rings 12, as shown in Figures 1 and 2 of the drawings. The gland is then attached to the stuffing box and the bolts D can be taken up as tight as they will stand without injuring my improved packing.

When taking up on the bolts D of the gland C pressure is applied on the outwardly extending annular flanges 16 of the yieldable crimps 11 which will slightly force said flanges 16 towards the shaft E and the opening B. It is to be noted that I have not provided beveled or angled faces on the metallic cup-shaped members, crimps, or rings 12 for increasing pressure on the shaft E, but I rely solely on the straight pressure against the flanges 16 for tightening the cylindrical portions 17 of the crimps against the shaft E for preventing leakage through the stuffing box. By constructing the packing in this manner, no matter how much the bolts D are taken up, pressure is not materially increased on the rod E so as to provide excessive friction on the rod for preventing such leakage. By constructing packings in this manner, the crimps will last a greater length of time and wear is eliminated to a great extent upon the rod E. The yieldable rings 12 are arranged between the outer surfaces of the flanges 16 of the crimps and the metallic cup member adjacent thereto for the purpose of preventing the metallic cup-shaped member cutting or otherwise destroying the flanges of the crimps, thus assuring longer life of the crimps. The beveled or angled surfaces 19 on the cylindrical flanges 17 of the crimps are provided so as to eliminate the danger of the outer periphery of said cylindrical flanges 17 being forced towards the rod E by engagement with the metallic cup-shaped member when taking up the gland C.

Naturally the greater pressure applied at the gland will increase friction on the rod, but it has been found that it is impossible to tighten the gland to create an excessive pressure on the rod as now commonly found in packings now on the market. The crimps do not wear very much at the outer ends of the cylindrical flanges 17, but do most of their wearing adjacent the point where the flange is arranged, as pressure sets the crimps closer to the rod by compressing the flange 16. When the crimps 11 are placed in a stuffing box, the corners 20 where the interior of the cylindrical flange 17 merges into the outer face of the flange 16 are rounded, but when pressure is applied upon the flanges 16 which compresses the same, the major portion of the cylindrical flange 17 engages the rod E until the crimp is compressed to the extent of forming a sharp corner at the point 20, thus providing a relatively long bearing surface against the shaft E of practically the same pressure. After the crimps have been used and are removed, it has been found that instead of having rounded corners 20 they are pressed to a rather sharp bend at the point 20.

Having thus described my invention, what I claim as new is:

A packing for stuffing boxes comprising a series of cup-shaped metallic members having openings arranged centrally therein, crimped yieldable members arranged between said metallic members, each crimped yieldable member having an outwardly extending disk-shaped portion and a cylindrical portion extending to one side of said disk-shaped portion and adapted to be received within said cup-shaped members, and yieldable ring-shaped members arranged between the bottoms of said cup-shaped members and the sides of said crimped yieldable members not having the cylindrical portions formed thereon.

In testimony whereof, I have affixed my signature.

THOMAS J. McNULTY.